United States Patent [19]

Purcell et al.

[11] Patent Number: 5,664,154

[45] Date of Patent: Sep. 2, 1997

[54] M/A FOR OPTIMIZING RETRY TIME UPON CACHE-MISS BY SELECTING A DELAY TIME ACCORDING TO WHETHER THE ADDRESSED LOCATION'S DIRTY BIT INDICATES A WRITE-BACK

[75] Inventors: Stephen C. Purcell, Mountain View; Paul W. Campbell, Oakland, both of Calif.

[73] Assignee: Chromatic Research, Inc., Mountain View, Calif.

[21] Appl. No.: 537,495

[22] Filed: Oct. 2, 1995

[51] Int. Cl.$^6$ ................................. G06F 13/16
[52] U.S. Cl. ...................... 711/167; 711/169; 711/143; 711/144
[58] Field of Search .................. 395/445, 470, 395/471, 494, 495, 496

[56] References Cited

U.S. PATENT DOCUMENTS

| | | | |
|---|---|---|---|
| 5,274,787 | 12/1993 | Hirano et al. | 395/470 |
| 5,293,496 | 3/1994 | White et al. | 395/288 |
| 5,293,621 | 3/1994 | White et al. | 395/650 |
| 5,301,162 | 4/1994 | Shimizu | 365/230.03 |
| 5,500,950 | 3/1996 | Becker et al. | 395/445 |
| 5,506,971 | 4/1996 | Gullette et al. | 395/296 |
| 5,511,224 | 4/1996 | Tran et al. | 395/800 |
| 5,559,985 | 9/1996 | Maemura | 395/467 |

OTHER PUBLICATIONS

Jim Handy, The Cache Memory Book, Academic Press, pp. 62–64 1993.
Steven Przybylski, "DRAMs for new memory systems", Microprocessor Report, v7 n3, p. 18(4) Mar. 1993.
Kaufman, J.S., "Blocking in a Completely Shared Resource Envrionment with State Dependent Resource and Residency Requirments", INFOCOM '92, pp. 2224–2232 (10A.1.1–10A.1.9) Jun. 1992.
"Rambus ASIC Cell User Guide and Specification", Steven Ray, Rambus, Inc., 1993, p. i, 2–7.
"A Rambus–Based System Board" Rambus, Inc. (7 pgs).

Primary Examiner—Tod R. Swann
Assistant Examiner—Keith W. Saunders
Attorney, Agent, or Firm—Skjerven, Morrill, MacPherson, Franklin & Friel; Edward C. Kwok

[57] ABSTRACT

A single dirty bit is maintained in a memory controller for each cache line of a cached memory system using a cache write-back policy. The dirty bit is set after each write access, is reset after each read access in which a cache miss occurs, and is left unchanged after all other memory accesses. The dirty bit is used to select a delay value for submitting a retry request packet after a cache miss occurred in a memory access. The delay value minimizes memory access time by allowing for a write-back operation only when necessary.

6 Claims, 8 Drawing Sheets

M/A FOR OPTIMIZING RETRY TIME UPON CACHE-MISS BY SELECTING A DELAY TIME ACCORDING TO WHETHER THE ADDRESSED LOCATION'S DIRTY BIT INDICATES A WRITE-BACK

BACKGROUND OF THE INVENTION

1. Field of the Invention

The present invention relates to memory system design; and, in particular, the present invention relates to cache memory system design.

2. Background of the Invention

Certain modular memory integrated circuits, which provide both random access memory (RAM) circuits and on-chip logic circuits for managing high-speed access to such RAM circuits, have become available. One example of such integrated circuits is the Rambus™ DRAM[1] (RDRAM). FIG. 1a shows a configuration of memory system 100 using RDRAMs. As shown in FIG. 1a, a microprocessor 101 interfaces memory system 100 through address bus 109, data bus 105 and control signal bus 110. Memory system 100 interfaces with microprocessor 101 over a Rambus access controller (RAC) 102. RAC 102 is available either in packaged integrated circuit form or as a standard cell to be incorporated into an application specific integrated circuit which require access to RDRAMs. Of course, RAC 102 and microprocessor 101 can also be incorporated into a single integrated circuit.

[1] Rambus DRAMs are available from Rambus Inc., Mountain View, Calif. 94040

RAC 102 controls a memory bus ("primary channel") 105, which is used for reading and writing a number of memory modules. As shown in FIG. 1, bus 105 serves RDRAMs 104-1, 104-2, . . . , 104-m and R-Modules 103-1, 103-2, . . . , 103-m. R-Modules are expansion modules which provide a second level hierarchy in memory system 100. Each R-Module includes a number of RDRAMs on a single secondary channel, which is controlled by a Rambus Transceiver (RTransceiver). The structure and operation of a RTransceiver are known to those skilled in the art. Memorybus clock signal ("Rambus Clock") 106 and system clock ("CPU clock") 107 are provided to RAC 102 to perform necessary synchronization between memory system 100 and microprocessor 101.

FIG. 1b is a block diagram of an RDRAM 104, which includes three "layers" of circuitry: application, logic and physical. In the application level, two banks 130a and 130b of dynamic random access memory (DRAM) are provided, each bank storing 256 kilobytes (9-bit bytes) of data. Banks 130a and 130b are provided row sense amplifier latches 131a and 131b, respectively. Each row sense amplifier latch holds a row (1 kilobytes) of data, which is larger than a row sense amplifier latch in a typical conventional page-mode DRAM. Row sense amplifier latches 131a and 131b serve, respectively, as caches for DRAM banks 130a and 130b. After a specified row is sensed and the data strobed into a row sense amplifier latch, CAS ("column address strobe") operation can select a specified byte within the row to be read or written. Row sense amplifier latches 131a and 131b input data from and output data to an internal 72-bit data bus 139. Row sense amplifier latches 131a and 131b are writeback caches, which are written back before RDRAM 104 processes a read or write cache miss.

The logic layer circuit of RDRAM 104 provides the control operations of RDRAM 104. Control layer circuit includes control circuit 133, and control registers 134. Registers 134 includes a register for specifying configuration and size data of RDRAM 104, a base address register and an address mapping register for mapping RDRAM 104 to the address space of microprocessor 101, and a number of other registers for specifying a number of configuration parameters. Further, mask register 132 is provided for bit-masking operations upon bits on internal data bus 139.

The physical layer circuit of RDRAM 104 provides an interface to primary channel (or a secondary channel, in an R-Module) 105. Primary channel 105 includes a 9-bit data bus 138a, a 1-bit bus control line 138b, and a 1-bit bus enable line 138c. Receiver 135 receives data and control signals from primary channel 105 and places the received data and control signals on internal data bus 139. Likewise, transmitter 137 receives data and control signals from internal data bus 139 and places the data and control signals on primary channel 105. Clock signals 140 and 141 are provided for synchronizing transmitting and receiving operations to the clock signals of RAC 102.

FIG. 1c is a block diagram of RAC 102. As shown in FIG. 1c, RAC 102 includes a microprocessor interface logic circuit 160 for receiving data from and transmitting data to microprocessor 101. For data to be sent to microprocessor 101, microprocessor interface logic circuit 160 retrieves data from receiver buffer 162. A multiplexer 163 passes either address or data from microprocessor interface logic circuit 160 to transmit buffer 161. Transmit and receive buffers 161 and 162 are provided for matching the data transfer rates between primary channel 105 and microprocessor interface logic circuit 160. Logic circuit 164 handles physical layer handshaking on primary channel 105, retrieves data from transmit buffer 161, packages the data thus retrieved into the packet format accepted on primary channel 105, and transmits the formatted data on primary channel 105. Logic circuit 165 handles physical layer handshaking on primary channel 105, receives data from primary channel 105, disassembles the packaged data received from primary channel 105, and stores the data thus obtained in receive buffer 162. Typically, Rambus clock 106 is provided at 4 times the clock rate of system interface logic circuit 160. Thus, a divide-by-4 circuit 166 is provided to step down Rambus clock 106 for timing use in RAC 102. RAC control logic 168 controls the operation of RAC 102. In addition, synchronization logic circuit 169 synchronizes operations with respect to the asynchronous Rambus clock 106 and CPU clock 107.

In a system such as that described in FIGS. 1a–1c, microprocessor 101 reads and writes memory using address bus 109, data bus 108 and control bus 110. In a conventional system, microprocessor 101 treats RAC 102 as a conventional memory controller. In turn, RAC 102 provides packeted data on primary channel 105. RAC 102 sends data packets to RDRAMs 104-1 to 104-n or R-Modules 103-1 to 103-m during read operations. Likewise, RAC 102 receives data packets from RDRAMs 104-1 to 104-n or R-Modules 103-1 to 103-m during write operations.

FIG. 2a shows a request packet 200 sent by microprocessor 101. In this example, clocks 140 and 141 on primary channel 105 has a four-nanosecond period, i.e. two 2-nanosecond data periods following an edge transition. Request packet 200 consists of six 10-bit words 205a–205f, sent over six data periods using 9-bit data bus 138a and control line 138b. In FIG. 2a, the 9-bit portion of each of request packet 200's 10-bit words sent over data bus 138a is indicated by reference numeral 200b, and the 1-bit portion of each of request packet 200's 10-bit words is indicated by reference numeral 200a. According to FIG. 2a, a 36-bit address is packed into request packet 200, using 2-bit field 203a (in 10-bit word 205f), 8-bit field 203b (in 10-bit word 205a), 8-bit field 203c (in 10-bit word 205b), 9-bit field 203d (in 10-bit word 205c) and 9-bit field 203e (in 10-bit word 205d). A 4-bit opcode, included in four 1-bit fields 202a–202d of 10-bit words 205a–205c, is provided to specify the memory access request. An 8-bit constant is specified in 2-bit field 204a of 10-bit word 205e, and two 3-bit fields 204b and 204c of 10-bit words 205e and 205f to indicate the block size to be read or written.

FIG. 2b shows an acknowledgement packet 220. Acknowledgement packet 220 is sent over two 2-nanosecond cycles as two 1-bit words on control line 138b (portion 220a). As shown in FIG. 2b, the acknowledgement message is provided in two 1-bit fields 222a and 222b over two 2-nanosecond cycles of bus clock 141. FIG. 2c shows a data packet 240. 36-bit data is sent to and received from RAC 102 over four 2-nanosecond cycles on four 9-bit words 242a–242d, which are provided consecutively over data bus 138a (portion 240b). As shown in FIG. 2c, the 36-bit data word received or transmitted are provided in four 9-bit fields 241a–241d of words 242a–242d.

As discussed above, each of the two DRAM banks of each RDRAM is cached in a row sense amplifier latch. The protocol utilized by primary channel 105 for a read cache hit, a read cache miss, a write cache hit and a write cache miss are illustrated by FIGS. 3a–3d, respectively. FIG. 3a illustrates a read cache hit. Initially, a read request packet 301 is sent by RAC 102 on data bus 138a and control line 138b. After an idle period 304 of 20 ns, an acknowledgement packet 302 from the addressed RDRAM is provided on control line 138b to indicate a cache hit. Thereafter, following a delay 305 (12 ns) subsequent to receiving acknowledgement packet 302, the addressed RDRAM returns a data packet 303 on data bus 138a. The data packet contains the block of data specified in request packet 301.

FIG. 3b illustrates a read cache miss. Initially, request packet 310 is sent by RAC 102. After a period 311 (20 ns), acknowledgement packet 313 is received on control line 138b indicating a cache miss. As a result, a time-out period 312 is provided by RAC 102 to allow the addressed row to be accessed and cached in the appropriate one of row sense amplifier latches 131a and 131b. During time-out period 312, a different RDRAM can be accessed, beginning 4 ns after acknowledgement packet 313 is received. After time-out period 312 expires, RAC 102 sends a retry request packet 314 on data bus 138a and control line 138b. Thereafter, acknowledgement packet 316 and data packet 318 are provided in the substantially in the same manner as discussed above with respect to a read cache hit.

FIG. 3c illustrates a write hit. Initially, RAC 102 sends request packet 320 to the addressed RDRAM, indicating a write access. After a predetermined period 321 (4 ns) following request packet 320 is sent, RAC 102 begins to transmit on data bus 138a data packet 322, which includes the data to be written. An acknowledgement packet 323 is sent by the addressed RDRAM, in response to request packet 320, to RAC 102 after a predetermined delay (20 ns). In this instance, acknowledgement packet 320 indicates a cache hit. Consequently, RAC 102 completes transmission of data packet 322.

FIG. 3d shows a write miss. Initially, RAC 102 transmits a write request packet 330 to an addressed RDRAM on data bus 138a and control line 138b, and begins to transmit data packet 332 on data bus 138a for writing into the address RDRAM. However, in this instance, acknowledgement packet 323 received from the addressed RDRAM on control line 138b indicates that a write cache miss has occur. Consequently, RAC 102 aborts transmission of data packet 332. A time-out period 334 is introduced, during which access to a different RDRAM is permitted after a predetermined period (4 ns) elapses. Subsequent to time-out period 334, RAC 102 submits a retry request packet 335. RAC 102 transmits data packet 337 following a predetermined period 336 (4 ns). Acknowledgement packet 338 indicates that a cache hit has occurred, thereby signalling RAC 102 that data packet 337 can proceed to complete transmission.

Because a row sense amplifier latch in an RDRAM is a write-back cache, whenever a read cache miss or a write cache miss occurs, any updated data in the row sense amplifier is written back into its DRAM bank before the row sense amplifier latch is refilled. Thus, additional cache miss processing, hence additional access time, is incurred in writing back "dirty" data. This additional cache miss processing is not incurred when the data in the row sense amplifier latch does not include unwritten back data. The difference in cache miss processing times between the "dirty" data situation and the "clean" situation (i.e. no write-back data) can be substantial.

In the prior art, a retry request packet is sent after a delay period defined according to a "worst case" scenario. That is, each cache miss requires data in the row sense amplifier to be written back into the corresponding DRAM. Clearly, for a cache line which has not been updated, this approach results in unjustified degradation of performance.

Since optimum performance requires that a retry request packet be sent immediately after cache miss processing is completed, such performance is only achieved when the retry request packet is sent at the time the refilled data arrives at the row sense amplifier latch of the address DRAM bank. Such refilled data arrival time varies according to whether a write-back is required.

SUMMARY OF THE INVENTION

In accordance with the present invention, a method and a logic circuit are provided for minimizing memory access time of a cache memory system in which the cache memory has a write-back policy. The method of the present invention includes, first, a step to provide a flip-flop for each cache line of the cache memory system. The flip-flop thus provided holds a dirty bit indicating whether a corresponding cache line includes data subject to write-back. Upon completion of a memory access, a dirty bit which corresponds to an addressed location of the memory access is updated. In this update step, the dirty bit is (i) set if the memory access is a write access, (ii) reset if the memory access is a read access in which a cache miss occurred, and (iii) unchanged otherwise. Whenever a cache miss in a memory access of the cache memory system occurs, a delay time is selected according to the dirty bit. The delay time is selected between a delay time minimized without consideration of a write-back duration for the cache memory system, and a delay time minimized with consideration of a write-back duration for the cache memory system.

In one embodiment, the selected delay time is loaded into a retry timer, which is used to generate a control signal to indicate a minimum retry interval after expiration of the selected delay time.

The present invention can be used in conjunction with a system including modular memory systems, e.g. rambus™ DRAMs. In such a memory system, the memory controller in which the dirty bit reside sends a retry request packet on a rambus™ channel coupled to the rambus™ DRAMs. In such a system, each cache line of the cache memory system corresponds to a row sense amplifier latch of a dynamic random access memory.

The present invention minimizes memory access time using only one single dirty bit to keep track of a cache line's write access state information.

The present invention is better understood upon consideration of the detailed description below and the accompanying drawings.

DETAILED DESCRIPTION OF THE PREFERRED EMBODIMENTS

Several approaches can be applied to correctly anticipate the earliest possible time to send a retry request. First, a "mirrored" cache directory can be provided in RAC 102 to allow RAC 102 to determine the total cache miss processing time. In the mirrored cache directory approach, the mirror cache directory includes, for each row sense amplifier latch, both the row address of the cached row and a dirty bit indicating whether updated data, yet to be written back, is included in the cached row. The cache miss processing time is determined to be much shorter if a write-back is not involved. However, the mirrored cache directory approach requires storing both the address bits indicating the addressed location and a dirty bit. Hence, the mirrored cache directory is expensive to implement from a silicon real estate standpoint.

Figure 1A:
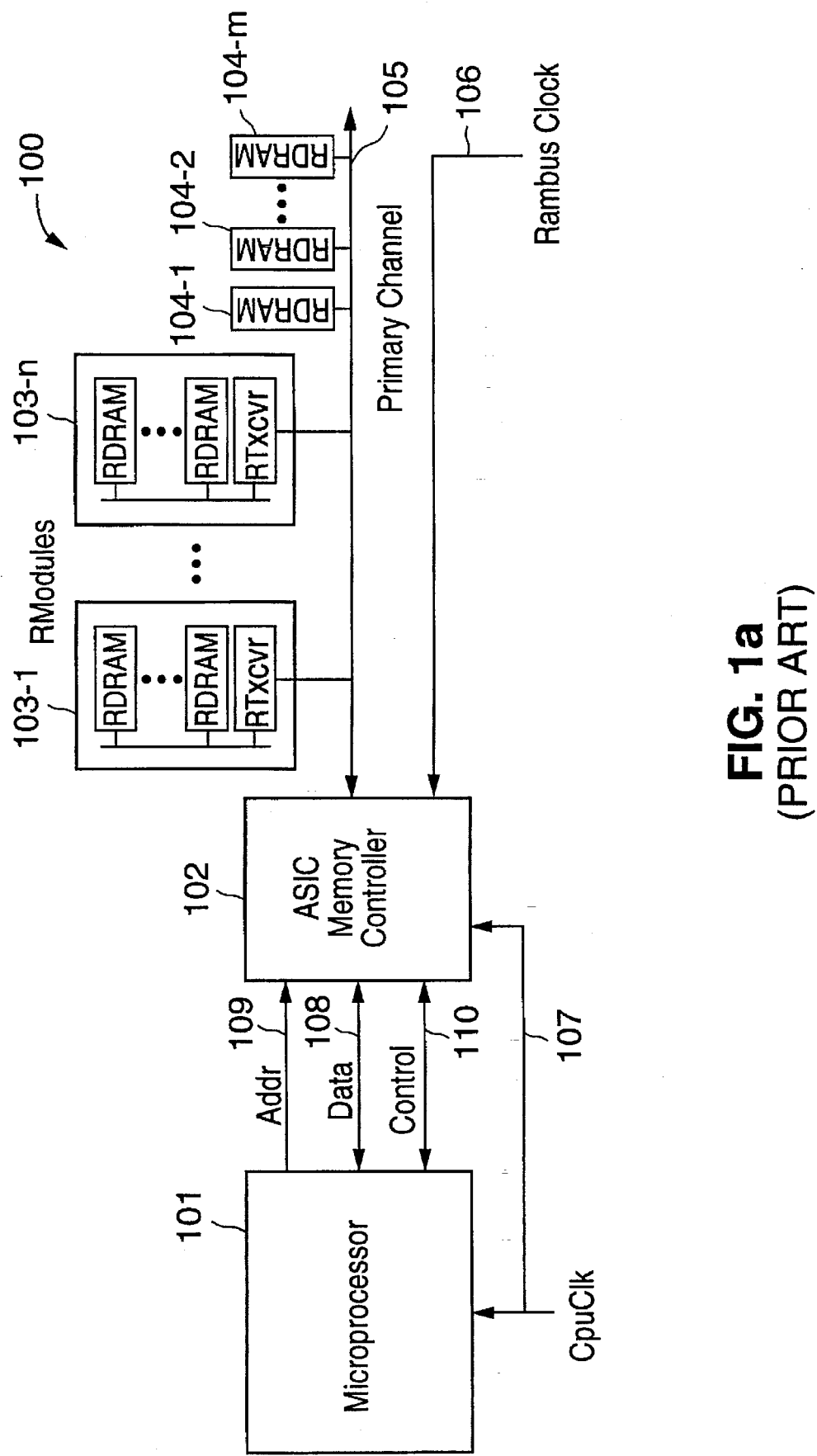
FIG. 1a shows a configuration of memory system 100 using Rambus™ DRAMs (RDRAMs).
Figure 1B:
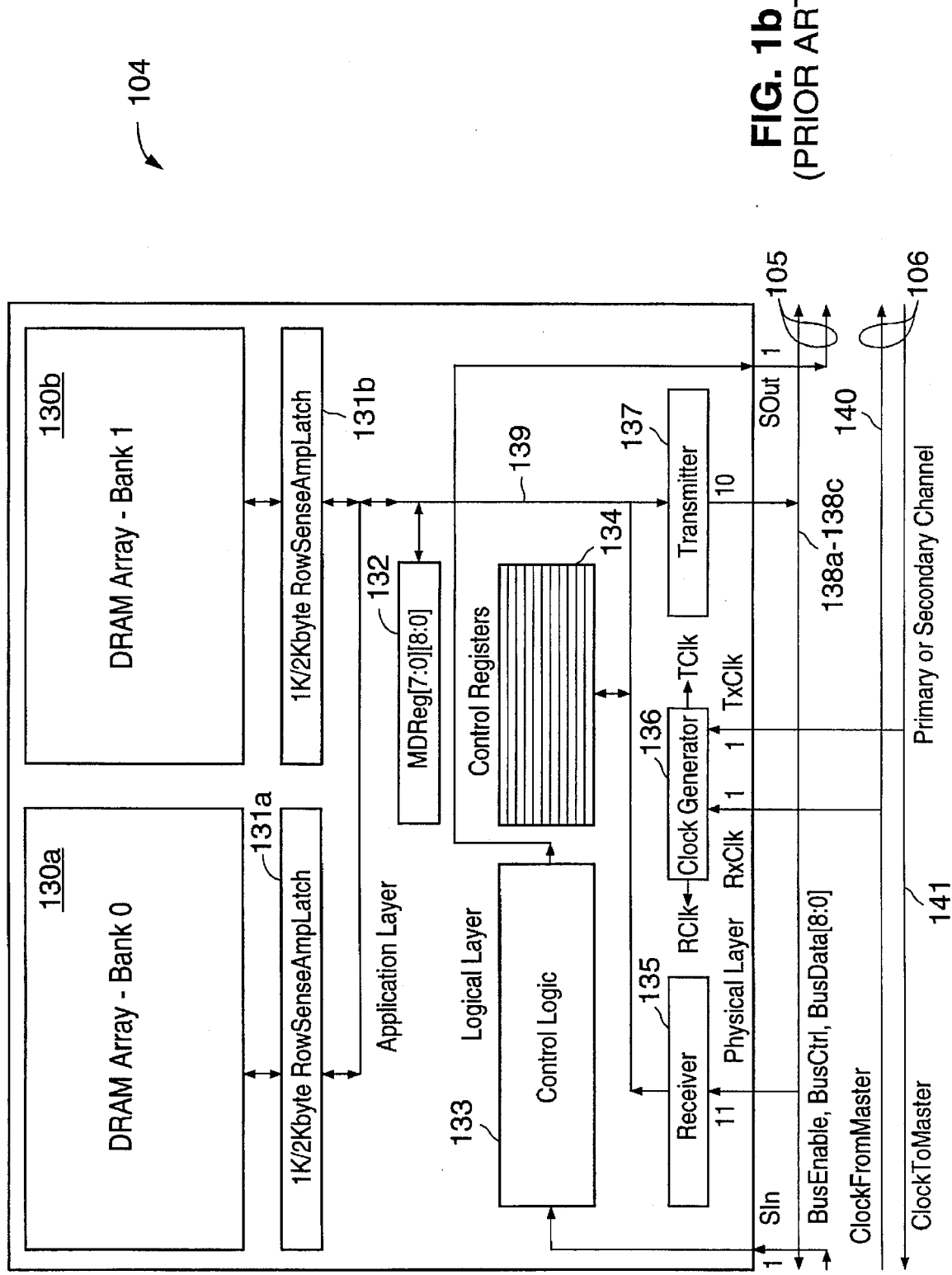
FIG. 1b is a block diagram of an RDRAM 104.
Figure 1C:
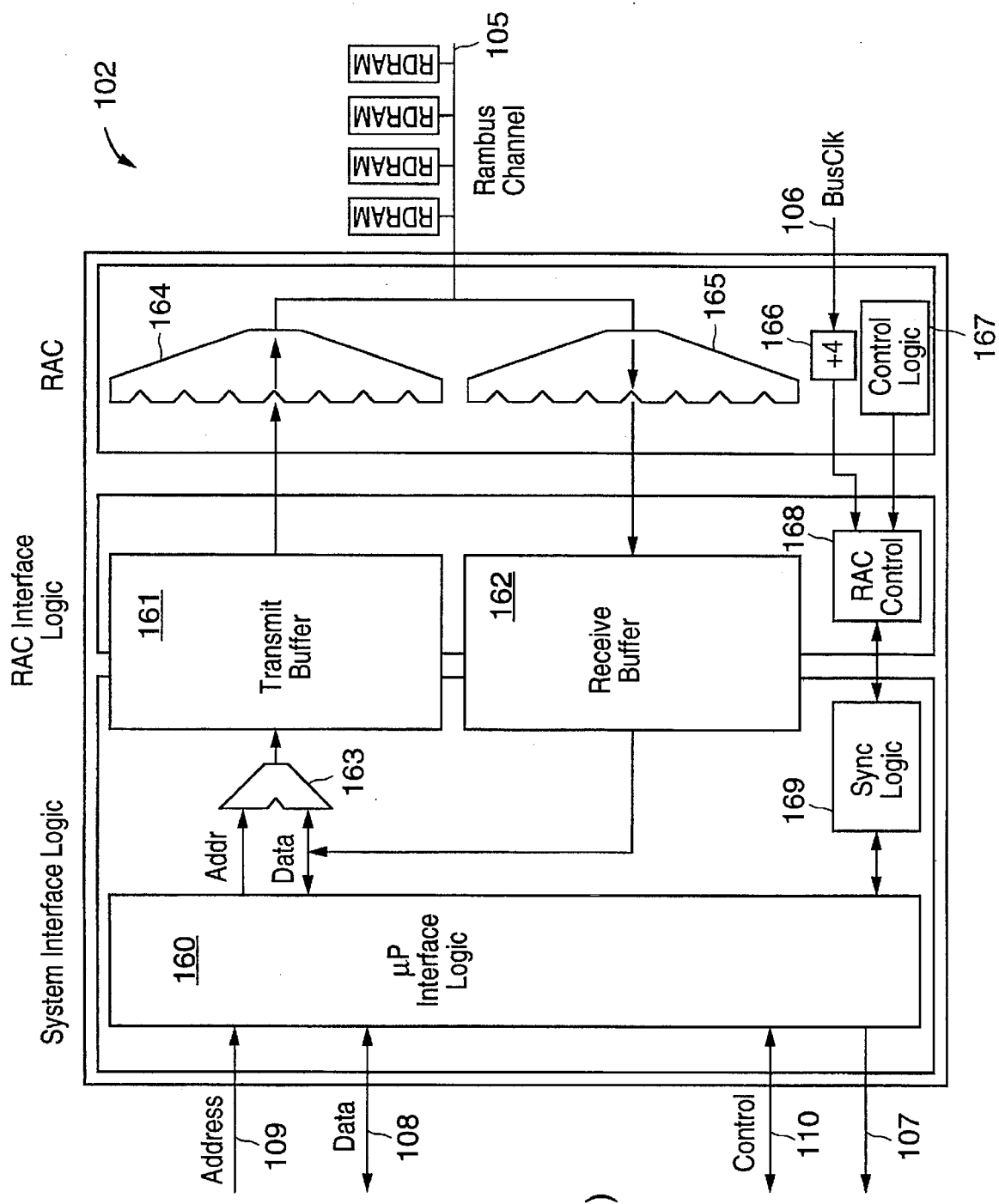
FIG. 1c is a block diagram of Rambus™ access controller (RAC) 102.
Figure 2A:
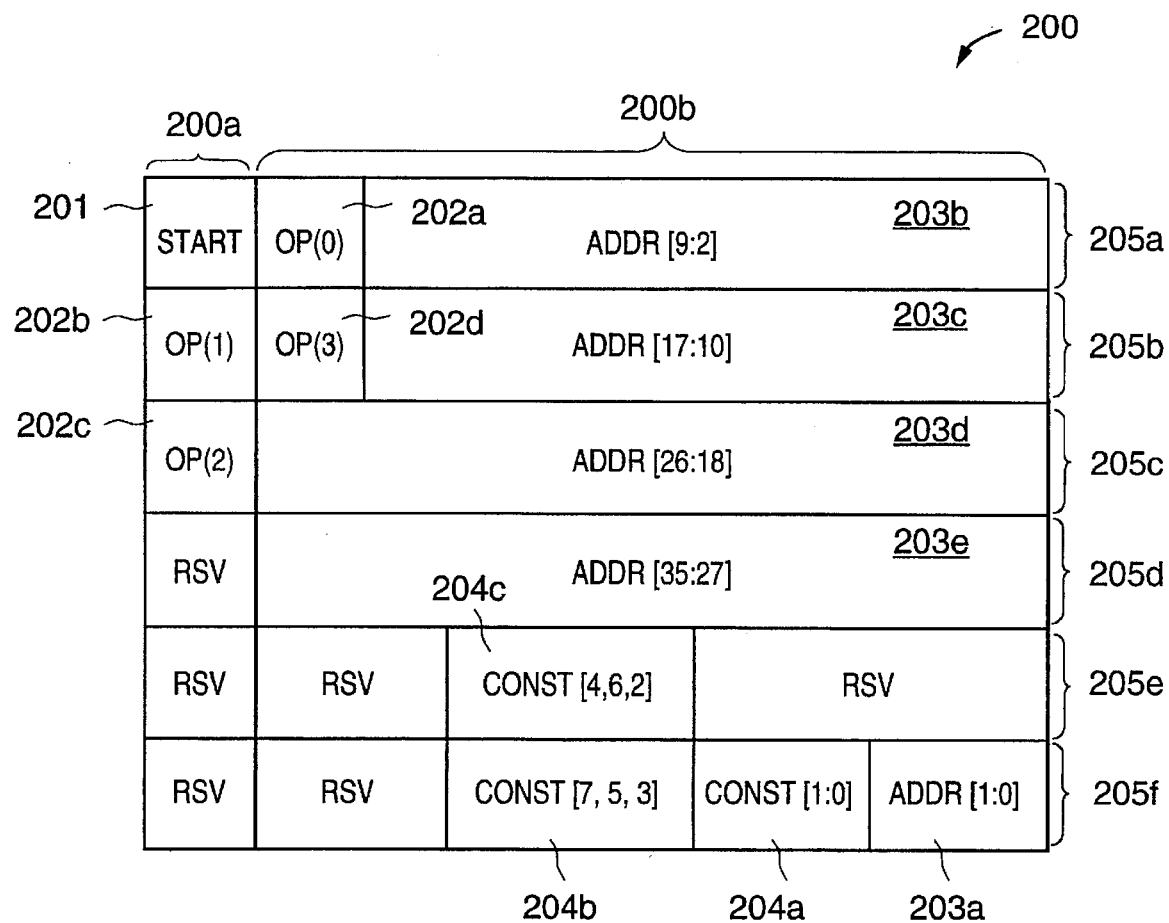
FIG. 2a shows a request packet 200 sent by microprocessor 101.
Figure 2B:
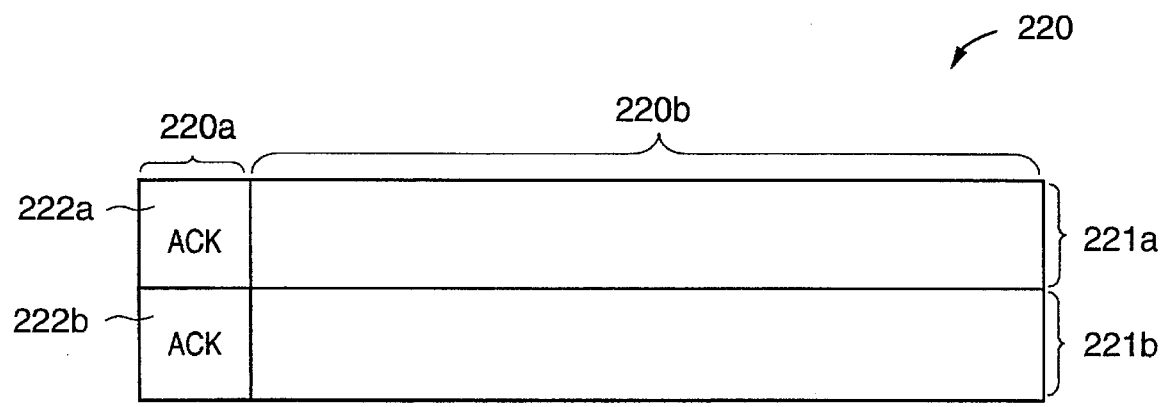
FIG. 2b shows an acknowledgement packet 220 received at RAC 102.
Figure 2C:
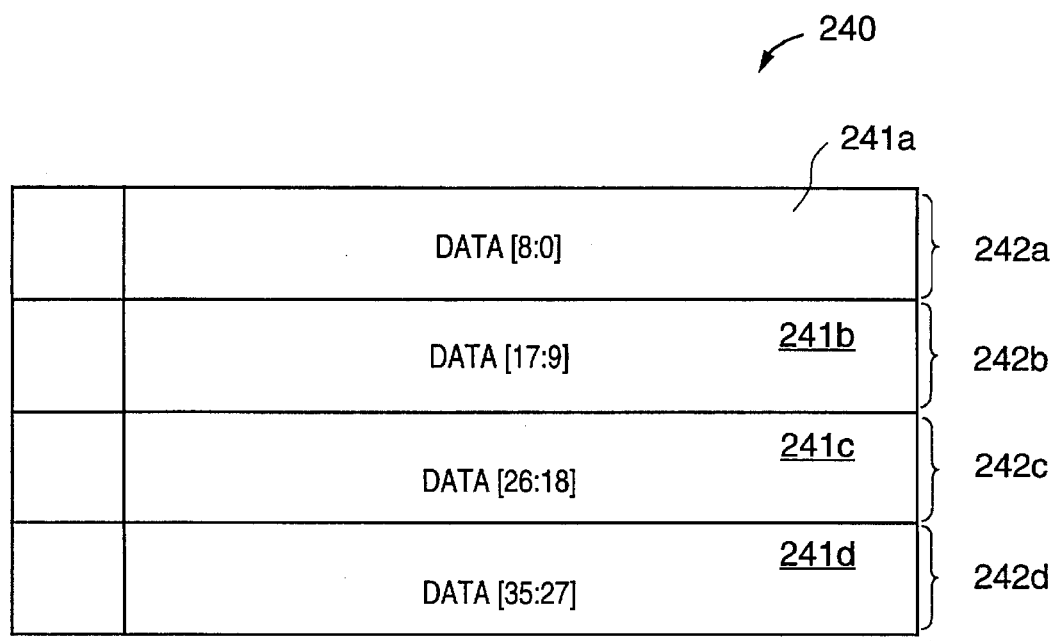
FIG. 2c shows a data packet 240.
Figure 4:
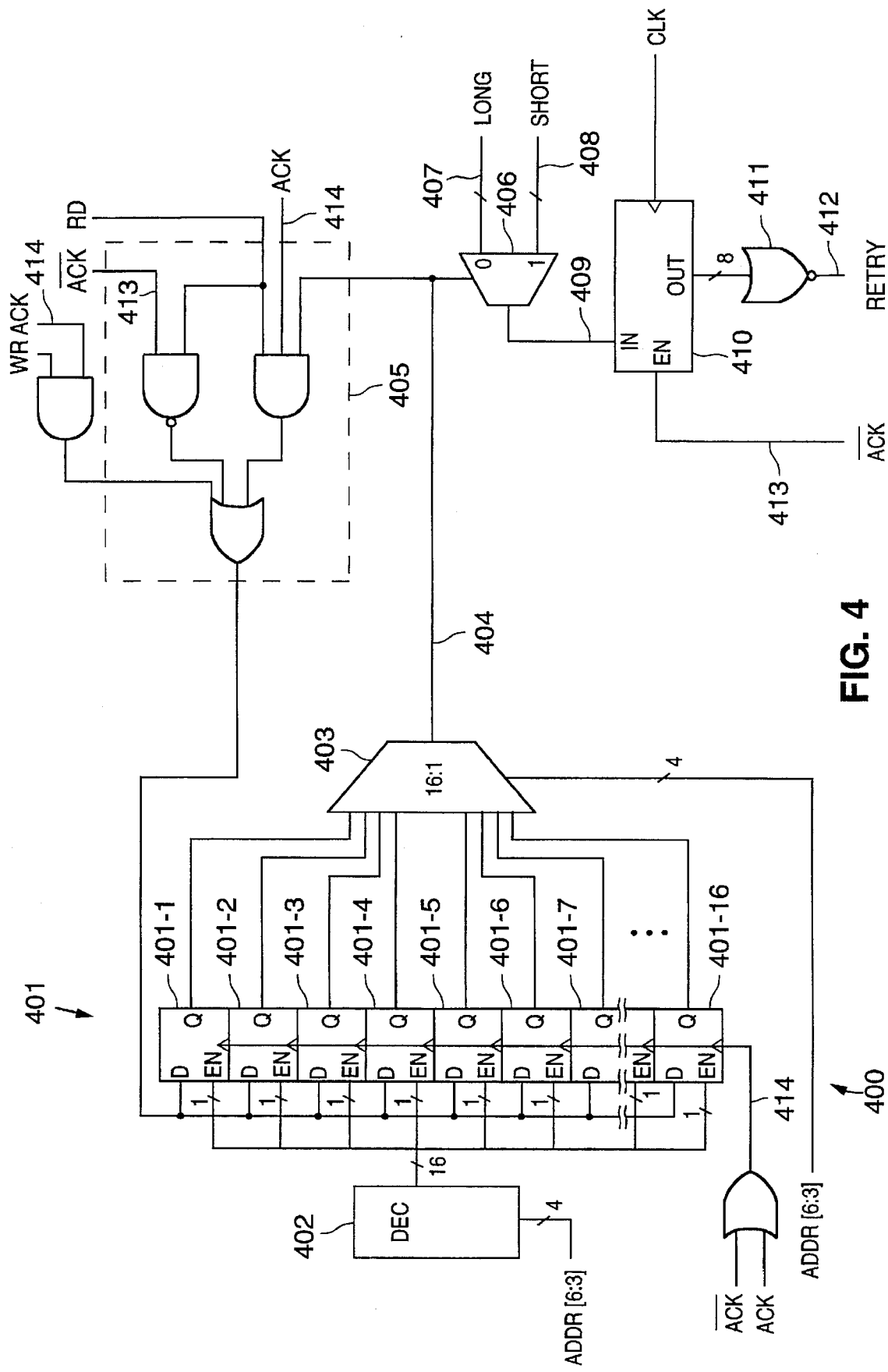
FIG. 4 is a schematic diagram 400, which includes a retry timer 410, in accordance with the present invention.

The present invention can be implemented in a computer system similar to that shown in FIG. 1a, with the modification to be discussed next. The present invention is illustrated with the aid of FIG. 4. FIG. 4 is a schematic diagram 400, which includes a retry timer 410, in accordance with the present invention. Retry timer 410 provides a control signal Retry which is asserted when retry timer 410 times out. Control signal Retry is used to trigger RAC 102 to send a retry request packet on primary channel 105 after a read or write cache miss.

The embodiment shown in FIG. 4 supports a primary channel shared by eight RDRAMs, or sixteen DRAM banks. Accordingly, four bits of an address (ADDR[6:3]) can be used to select one of the sixteen DRAM banks. As explained above, each DRAM bank is associated with a 1024-bit row sense amplifier latch which serves as a write-back cache for the associated DRAM bank. As shown in FIG. 4, in accordance with the present invention, sixteen flip-flops, designated flip-flops 410-1 to 401-16, are provided in RAC 102 to each hold a dirty bit corresponding to one of the sixteen row sense amplifier latches of the eight RDRAMs. A decoder 402 is provided to decode the four address bits of Addr[6:3] specified in each memory access, so as to enable updating of the corresponding dirty bit in flip-flops 401-1 to 401-16. The selected dirty bit is updated at the completion of each read or write access. In this embodiment, successful completion of a read or write access is signalled by the control signal ACK on lead 414. Likewise, a cache miss is signalled by the control signal $\overline{ACK}$.

Logic circuit 405 sets the selected dirty bit after each write operation, resets the selected dirty bit after each read access in which a cache miss occurred, and leaves the value of dirty bit unchanged otherwise. A dirty bit which is set indicates that the corresponding row sense amplifier latch contains, at the completion of the previous read or write access, data to be written back to the corresponding DRAM bank.

Figure 3A:
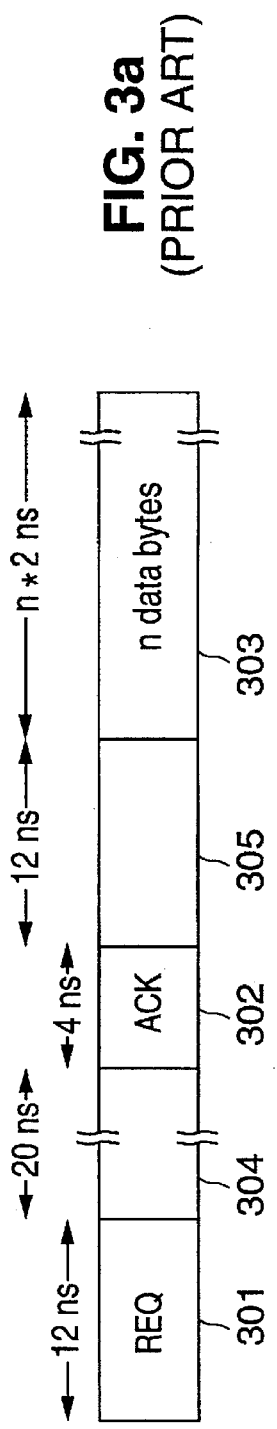
FIG. 3a illustrates the protocol utilized on primary channel 105 for a read cache hit.
Figure 3B:
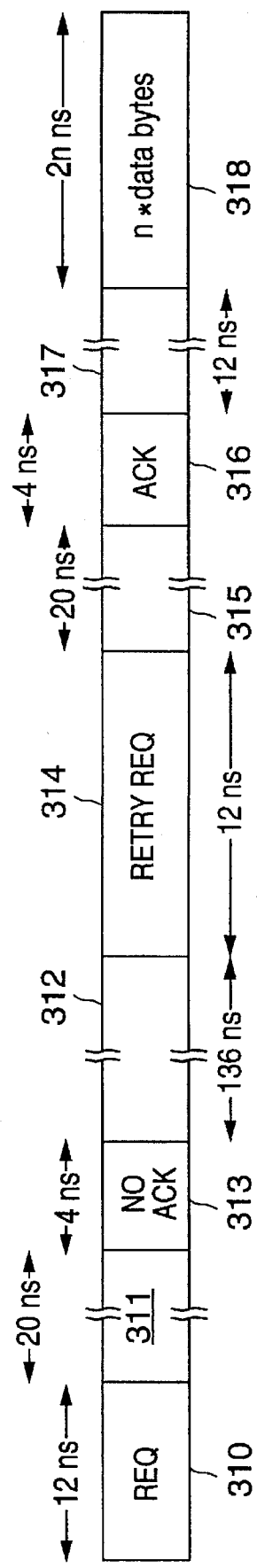
FIG. 3b illustrates the protocol utilized on primary channel 105 for a read cache miss.
Figure 3C:
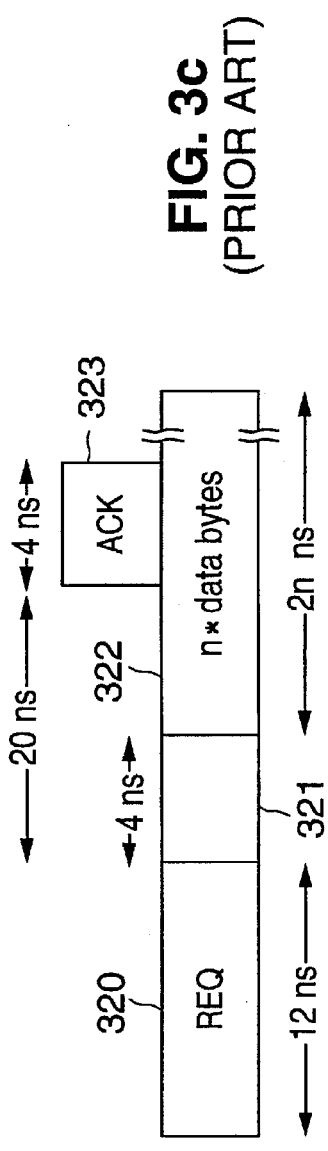
FIG. 3c illustrates the protocol utilized on primary channel 105 for a write cache hit.
Figure 3D:
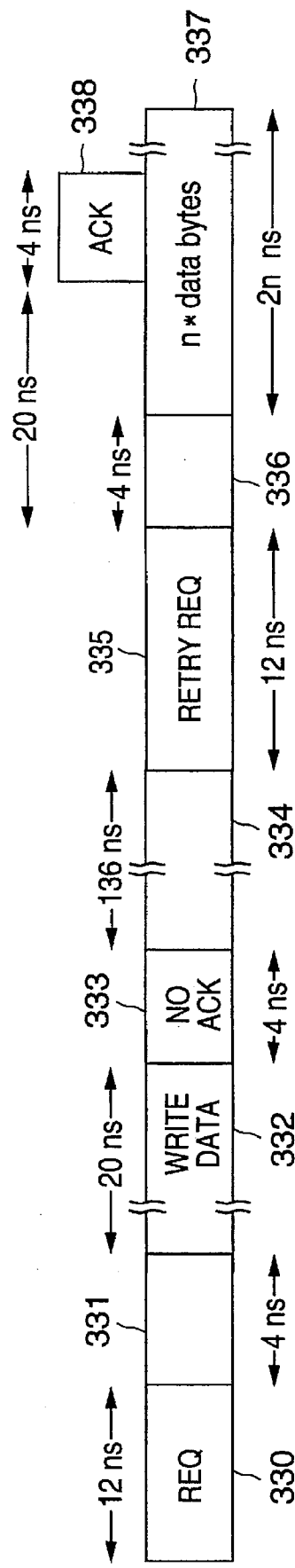
FIG. 3d illustrates the protocol utilized on primary channel 105 for a write cache miss.

In any read or write access, when a cache miss occurs, the dirty bit corresponding to the addressed memory bank of the RDRAMs is used to select an appropriate delay value. As shown in FIG. 4, a 16-to-1 multiplexer 403 is provided to select the dirty bit corresponding to the DRAM bank addressed. The selected dirty bit, which is placed on lead 404, is used to select either a long delay value provided on bus 407, or a short delay value provided on bus 408. The long delay value on bus 407 represents a cache miss processing time in which a write-back step for "dirty" data in the corresponding row sense amplifier latch is performed. The short delay value on bus 408 represents a cache miss processing time in which a write-back is not performed. In one embodiment, in which primary channel 105 has the timing characteristics shown in FIGS. 3a–3C, the long delay value on bus 407 is selected to be 116 ns, including a 10% margin. In that same embodiment, the short delay value on bus 408 is selected to be 84 ns, also including a 10% margin. The selected delay value, represented by the output value of multiplexer 406 on lead 409, is loaded into retry timer 410, when the signal $\overline{ACK}$ on lead 413 is asserted. Control signal $\overline{ACK}$ is asserted when a cache miss occurs in a read or write memory access. When retry timer 410 times out, represented by the asserted control signal Retry on lead 412, RAC 102 sends a retry request packet to the corresponding RDRAM.

Thus, by maintaining only a single dirty bit for each row sense amplifier latch, the present invention allows a retry packet to be sent to the corresponding RDRAM to complete the read and write access.

The detailed description above is provided to illustrate specific embodiments of the present invention and is not intended to be limiting. Numerous variations and modifications within the scope of the invention are possible. The present invention is defined by the claims appended hereinbelow.

I claim:

1. A method for minimizing memory access time of a cache memory system in which the cache memory has a write-back policy, said method comprising the steps of:

providing a flip-flop for each cache line of said cache memory system, each flip-flop holding a dirty bit indicating whether a corresponding cache line includes data subject to write-back;

updating, upon completion of a memory access, that dirty bit which corresponds to an addressed location of said memory access, said updating step (i) setting said dirty bit, if said memory access is a write access; (ii) resetting said dirty bit, if said memory access is a read access in which a cache miss occurred, and (iii) leaving said dirty bit unchanged otherwise;

when a cache miss occurs during a subsequent memory access of said addressed location, selecting a delay time according to said dirty bit between a first delay time and a second delay time, said first delay time being a delay time minimized without consideration of a write-back duration for said cache memory system, said second delay time being a delay time minimized with consideration of a write-back duration for said cache memory system;

loading said delay time into a retry timer; and asserting a control signal to indicate a minimum retry interval when said retry timer expires after said selected delay time.

2. A method as in claim 1, wherein said cache memory system comprises modular memory integrated circuits having a high-speed memory bus, and said method further comprises the step of sending a retry request packet on said memory bus.

3. A method as in claim 1, wherein each cache line of said cached memory system is provided is provided in a row sense amplifier latch of a dynamic random access memory.

4. A circuit for minimizing memory access time of a cache memory system in which the cache memory has a write-back policy, said circuit comprising:

a flip-flop for each cache line of said cache memory system, each flip-flop holding a dirty bit indicating whether a corresponding cache line includes data subject to write-back;

a logic circuit for updating, upon completion of a memory access, that dirty bit which corresponds to an addressed location of said memory access, said updating step (i) setting said dirty bit, if said memory access is a write access; (ii) resetting said dirty bit, if said memory access is a read access in which a cache miss occurred, and (iii) leaving said dirty bit unchanged otherwise;

a circuit for selecting, during a subsequent memory access of said addressed location, a delay time according to said dirty bit between a first delay time and a second delay time, said first delay time being a delay time minimized without consideration of a write-back duration for said cache memory system, said second delay time being a delay time minimized with consideration of a write-back duration for said cache memory system; and a retry timer receiving said selected delay time and generating a control signal to indicate a minimum retry interval after expiration of said selected delay time.

5. A circuit as in claim 4, wherein said cache memory system comprises modular memory integrated circuits having a high-speed memory bus, and said memory system further comprises a logic circuit for sending a retry request packet on said memory bus.

6. A circuit as in claim 4, wherein each cache line of said cached memory system is provided in a row sense amplifier latch of a dynamic random access memory.

* * * * *